United States Patent [19]

Keller et al.

[11] Patent Number: 5,259,234

[45] Date of Patent: Nov. 9, 1993

[54] CALIBRATION SYSTEM FOR AIR METERING BELLMOUTHS

[75] Inventors: Richard G. Keller; Mina Dimov, both of Cincinnati, Ohio

[73] Assignee: General Electric Company, Cincinnati, Ohio

[21] Appl. No.: 848,562

[22] Filed: Mar. 9, 1992

[51] Int. Cl.$^5$ ............................................. G01F 25/00
[52] U.S. Cl. ............................................................. 73/3
[58] Field of Search ............... 73/3, 4 R; 356/28, 28.5; 415/118

[56] References Cited

U.S. PATENT DOCUMENTS

| | | | |
|---|---|---|---|
| 3,759,091 | 9/1973 | Reimer | 73/116 |
| 3,930,742 | 1/1976 | Boyce | 415/1 |
| 4,148,585 | 4/1979 | Bargeron et al. | 356/28.5 |
| 4,290,298 | 9/1981 | Severson | 73/3 |
| 4,317,178 | 2/1982 | Head | 364/510 |
| 4,372,171 | 2/1983 | Brandt, Jr. | 73/861.66 |
| 4,433,584 | 2/1984 | Kokoszka | 73/861.66 |
| 4,600,301 | 7/1986 | Snyder | 356/28.5 |
| 4,854,174 | 8/1989 | Keith | 73/204.22 |
| 4,859,055 | 8/1989 | Gal et al. | 356/28 |
| 4,989,969 | 2/1991 | Siebert | 356/28 |
| 5,000,566 | 3/1991 | Kuppenheimer | 356/28 |

FOREIGN PATENT DOCUMENTS 1045033 9/1983 U.S.S.R. .................. 73/4 R

OTHER PUBLICATIONS

"Aircraft Engine Inlet Airflow Measurement", B.S.M.E. University of Cincinnati, 1983, by Mina Dimov.
"Laser Technology In Aerodynamic Measurements", Advisory Group for Aerospace Research and Development, Paris, France, Mar. 1972.
"Practical Application of LV Systems To Aero Engine Research And Development", Aircraft Engine Group, by D. C. Wisler and P. W. Mossey, 1977.

Primary Examiner—Robert Raevis
Attorney, Agent, or Firm—Jerome C. Squillaro; John R. Rafter

[57] ABSTRACT

The present invention provides a system, including apparatus and method, using a National Bureau of Standards (NBS) traceable laser velocimeter for in situ calibration of a traversing static pressure probe used to determine a velocity distribution in an air metering bellmouth for testing aircraft gas turbine engines. The invention is particularly useful for large fan-jet engines may be used to calibrate rake mounted probes capable of wall-to-wall stream static pressure survey measurements.

9 Claims, 3 Drawing Sheets

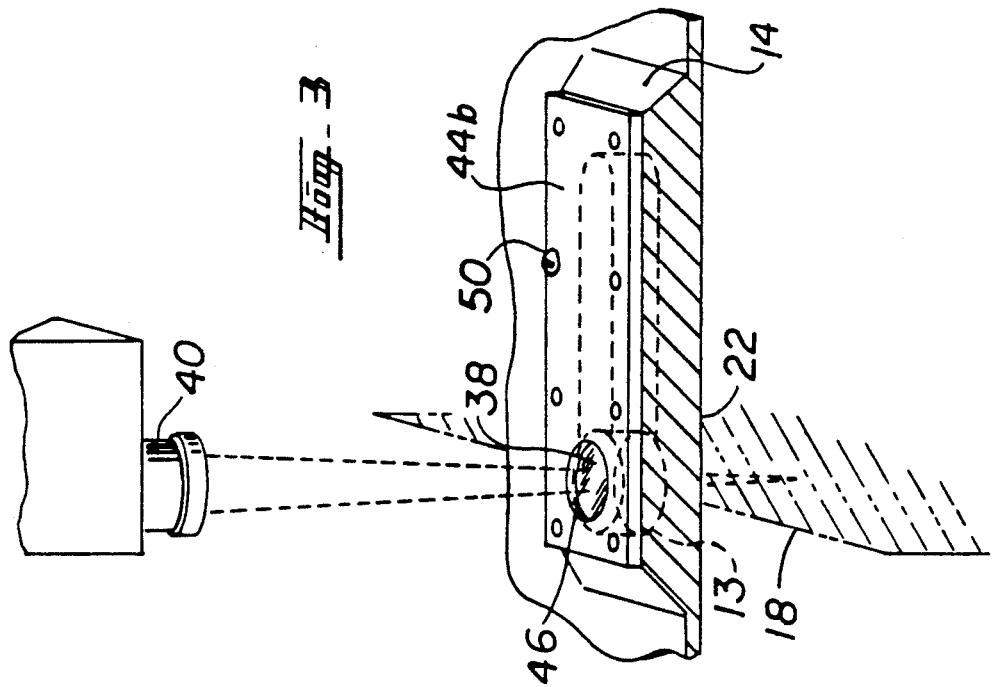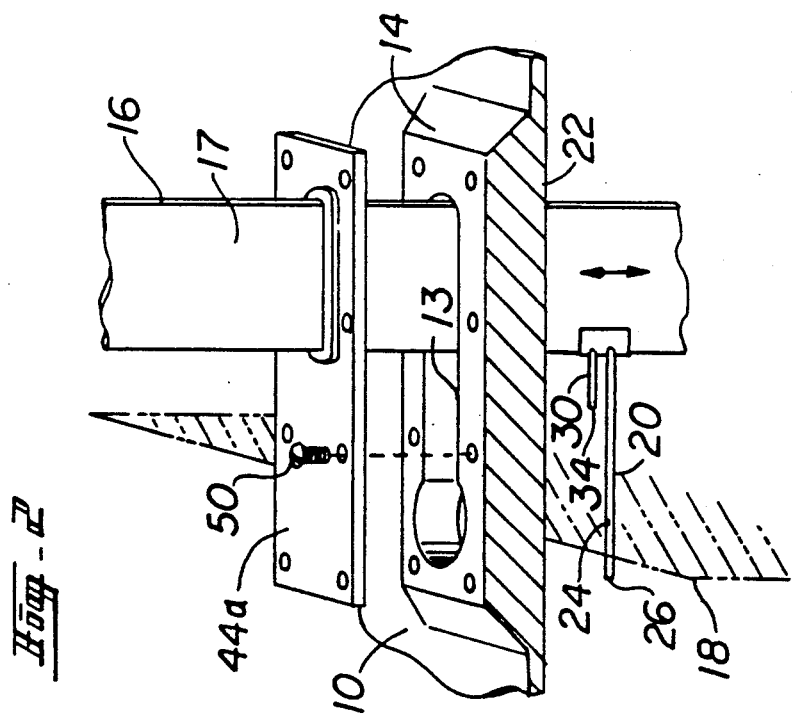

CALIBRATION SYSTEM FOR AIR METERING BELLMOUTHS

BACKGROUND OF THE INVENTION

1. Field of the Invention

This invention relates to jet engine testing and more particularly to a calibration system and method used to help analyze inlet flows through a bellmouth test inlet.

2. Description of Related Art

Aircraft gas turbine engines require many ground tests during the development and life time of the engine. Accurate measurement of three "basic" performance parameters, airflow, fuel flow, and thrust, are required to define basic "test-measured" engine performance characteristics. Accuracy requirements for each of the three "basic parameters' are of equal importance to typical subsonic turbofan applications.

For example, at 35,000 feet and Mach=0.8 cruise conditions, a 1% error in engine airflow equates to a 1.25% momentum related error in net thrust and/or SFC for a typical General Electric CF6-8OC2 turbofan engine. The same conditions result in a 1.4% error in net thrust and/or SFC for a General Electric CFM56-3B turbofan engine.

It is very important to be able to accurately measure the basic performance parameters with calibration verifiable systems. All test procedures have fundamentally inherent uncertainties that translate into uncertainties in both test measured and flight guaranteed performance capabilities of the engine. Therefore it is very important to get as accurate measurements as possible.

Industry accepted standards and equipment needed to calibrate both thrust and fuel flow measuring systems have been available for many years. Thrust measurement systems capable of ±0.1% accuracy levels, and fuel flow measurement systems capable of ±0.5% accuracy levels, based on National Bureau of Standards (NBS) traceable calibration standards, are in current use in the industry. Comparable degrees of airflow measurement accuracy are not yet available. There are no comparable standards, methods, and/or equipment capable of calibrating current and new large turbofan air metering bellmouths.

Furthermore, the airflow levels of newer engine models having higher thrust levels and airflow, up to 2000 lbs/sec for the General Electric CF6-80E and up to 3200 lbs/sec for the General Electric GE90, far exceed current measurement system capabilities of most of the large engine altitude test facilities (AEDC, NGTE, and P&WA Wilgoose). The problem is particularly acute for large fan engines because of the large size of the bellmouths. The problem is further heightened because some type of back-to-back test program to compare test measured engine airflow data obtained from bellmouth systems to data obtained from some other type of system, i.e. having venturi based equipment, in another facility is not feasible.

One conventional type of calibration of large engine bellmouths has been accomplished by a procedure which employs metering plane stream static pressure measurements obtained from currently available pitot-static inlet rakes. The rake measured stream static pressure measurements, used to determine local velocity levels and distributions, are compared to predicted levels which are based on "bellmouth measured," and therefore allegedly validated, wall static referenced flow rates. The system is somewhat flawed and limited by the relatively large inherent uncertainties in the rake measured stream static pressure levels, and the fixed number of sample locations, typically six immersions and four rakes, which provide representative, but incomplete measurements of the wall-to-wall distribution of stream flow characteristics.

The uncertainties inherent in the rake measured stream static pressure levels are due to flow field changes caused by the rake and more particularly related to the rake size, shape (which causes blockage) characteristics, and the bellmouth size, shape, and flow field characteristics. Pylon shaped rakes have different pressure coefficients at each immersion because of strut chord and thickness related influence on the measurement location pressure levels. The same rake set installed in two different bellmouths, may have two significantly different, installation peculiar, sets of pressure coefficients. Rake probe pressure coefficient levels are peculiar to the rake biased bellmouth flow field characteristics and, as such, cannot be accurately evaluated in some other, significantly different, flow field environment. Conventionally, rakes are calibrated at locations other than in situ as in the bellmouth and therefore are subject to various anomalies which reduce the accuracy of the rake type pressure measuring device.

Other considerations include the length of the bellmouth and the length of the pressure probes. An ideal bellmouth would be long enough to completely smooth out and straighten the flow within, but practical weight and size requirements do not allow for such ideal conditions. The pressure probes are relatively short and flow around the static probe aperture is influenced by both the nose of the probe and the rake body itself which adds uncertainty to the measurements. The probes cannot be lengthened for they would be subject to failure inducing vibrational loads.

Therefore a primary objective of the present invention is to provide an accurate system of calibrating a rake mounted stream static pressure measuring device used for determining airflow velocities in a bellmouth inlet of a turbofan engine test apparatus.

SUMMARY OF THE INVENTION

The present invention provides a system, including apparatus and method, using a National Bureau of Standards (NBS) traceable laser velocimeter device and measurements for in situ calibration of a traversing static pressure rake probe used for determining local velocities and which is capable of wall-to-wall stream static pressure survey measurements. The calibrated rake probe system can then be used as a secondary standard pressure measurement device to calibrate an air metering bellmouth by "measured to predicted" stream static pressure level comparisons using conventional, preferably computerized, analysis methods.

The preferred embodiment includes a means for determining the static pressure distribution through a metering plane perpendicular to and in the flow of a bellmouth test inlet using a static pressure probe means, preferably a translating rake having more than one probe in order to provide overlapping readings. The invention also includes a means to measure the velocity of the flow in a region near the wall of the bellmouth essentially in the metering plane. In the preferred embodiment a rake pad is provided for mounting a translating rake having a plurality of static pressure probes to measure static pressures in the metering plane and alternately mounting a laser velocimeter measuring means including an optical window for measuring the velocity of the flow in a region near the wall of the bellmouth essentially in the metering plane.

The preferred embodiment provides a method for calibrating the translating rake static pressure probes by comparing the velocity distribution derived from the static pressure measurements to the laser velocimeter measured velocity distribution. The calibration method further includes deriving calibration factors for biasing static pressure probe measurements from testing.

ADVANTAGES

Among the advantages provided by the present invention is an accurate system of calibrating a rake mounted stream static pressure measuring device used for determining airflow velocities in a bellmouth inlet of a turbofan engine test apparatus based on National Bureau of Standards (NBS) traceable calibration standards. There are no comparable standards, methods, and/or equipment capable of calibrating current and new large turbofan air metering bellmouths.

Furthermore, the airflow levels of newer engine models having higher thrust levels and airflow, up to 2000 lbs/sec for the General Electric CF6-80E and up to 3200 lbs/sec for the General Electric GE90, far exceed current measurement system capabilities of most of the large engine altitude test facilities (AEDC, NGTE, and P&WA Wilgoose). The problem is particularly acute for large fan engines because of the large size of the bellmouths. The problem is further heightened because some type of back-to-back test program to compare test measured engine airflow data obtained from bellmouth systems to data obtained from some other type of system, i.e. having venturi based equipment, in another facility is not feasible.

BRIEF DESCRIPTION OF THE DRAWINGS

The foregoing aspects and other features of the invention are explained in the following description, taken in connection with the accompanying drawings where:

FIG. 2 is an illustration of a traversing static pressure probe rake mounted to a rake pad and in accordance with the preferred embodiment of the present invention.

FIG. 3 is an illustration of a laser velocimeter used in conjunction with a rake pad in accordance with the preferred embodiment of the present invention.

DETAILED DESCRIPTION OF THE INVENTION

Figure 1:
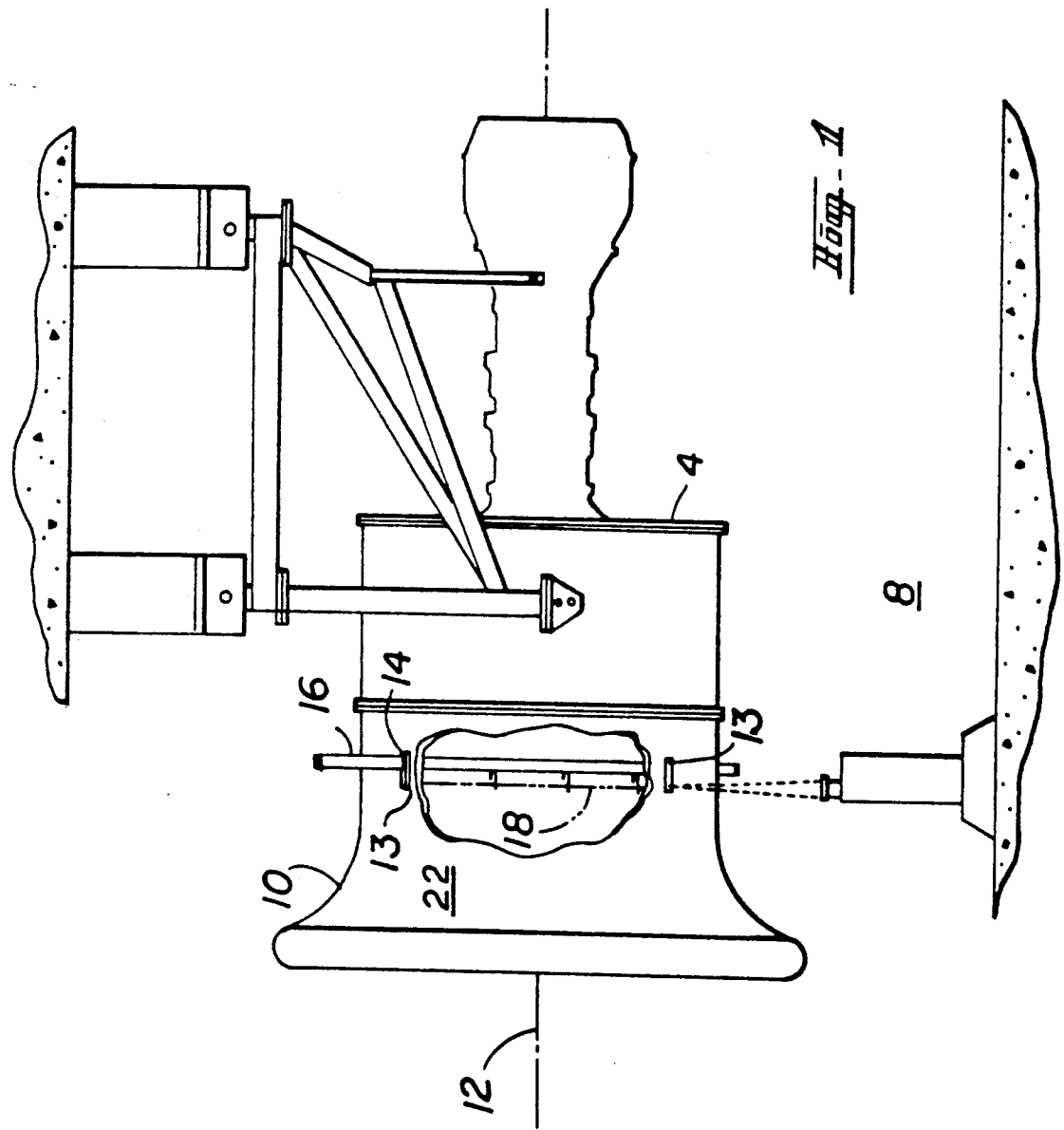
FIG. 1 is a cross-sectional partial cutaway view of a turbofan engine mounted in a static test assembly illustrating a metering bellmouth inlet calibration system in accordance with the preferred embodiment of the present invention.

Illustrated in FIG. 1 is a turbofan gas turbine engine 4 mounted in a conventional fashion in a static test facility generally shown at 8 and having an air metering bellmouth inlet 10, herein after referred to as bellmouth 10, connected to the engine. Bellmouth 10 has a centerline 12 and includes a plurality of ports 13 circumferentially disposed around bellmouth 10. A rake pad 14 is used to mount a conventional static pressure probe traversing rake 16 in bellmouth 10 through port 13 for taking static pressure measurements in a flow through a metering plane 18 which is perpendicular to a wall 22 of the bellmouth 10.

Referring now to FIG. 2, the rake 16 is shown mounted to rake pad 14 and disposed through one of the ports 13. A plurality of static pressure probes 20 are mounted on rake 16 such that when a pressure measuring traverse is made there will be overlapping coverage of some portions of the metering plane 18 in the radial direction of traverse (indicated by the arrows). The axial position of the metering plane 18 coincides essentially with static pressure apertures 24 on the static pressure probes 20. It is readily seen that the blunt edge 26 of static pressure probe 20 has an effect on measurements made using the static pressure probe.

A total pressure probe 30, having a total pressure aperture 34, is also mounted upon the traversing rake 16 in the general vicinity or the static pressure probe 20. During testing, measurements are preferably made at various radial positions and the rake 16 will be moved to different rake mount positions or ports 13. For calibration runs the rake 16 is positioned and disposed through rake pad 14 at different lengths so as to take measurements in a region near a portion of the wall 22 of the bellmouth 10 using the different probes 20 as indicated by the dashed line rake and probe drawings in FIG. 4.

Figure 4:
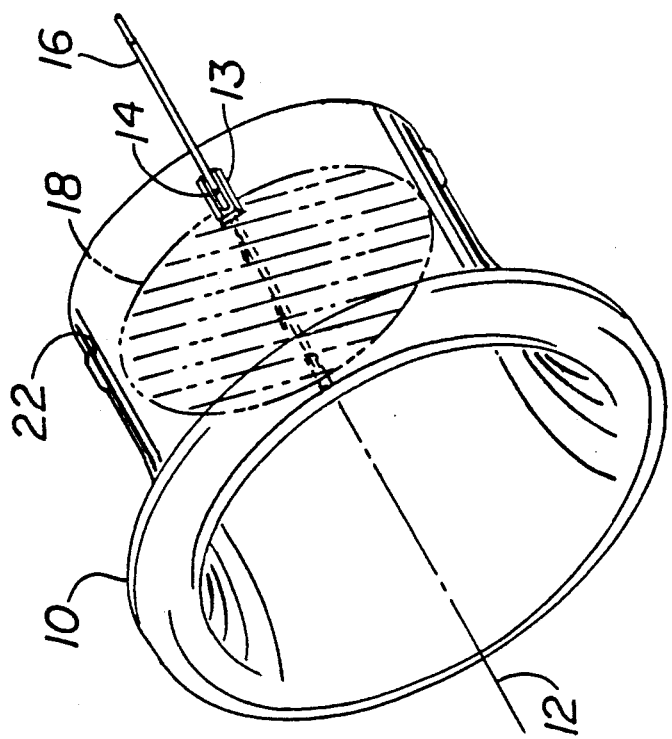
FIG. 4 is an illustration of the use of a traversing static pressure probe rake in accordance with the preferred embodiment of the present invention.

Referring to FIGS. 2 and 4, the static pressure probes 20 are mounted on a constant area strut 17 of the traversing rake 16, which radially spans the metering plane 18 through centerline 12 and extends out through the bellmouth wall 22 on either end so that strut-caused interference affects and/or probe pressure coefficient levels do not change when the probe is translated to different radial positions.

Figure 5:
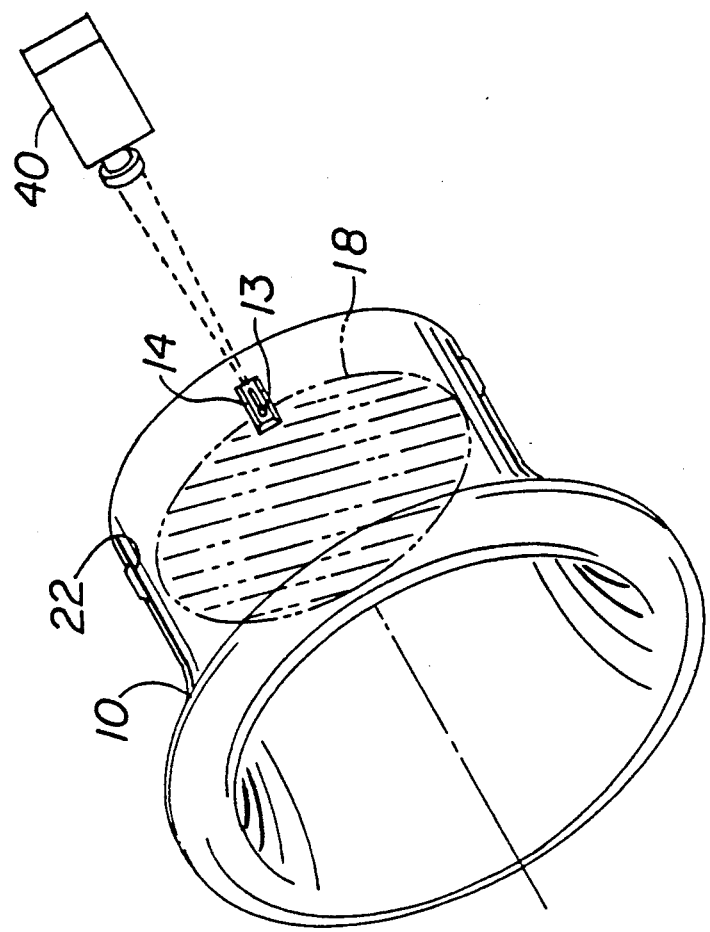
FIG. 5 is an illustration of the use of a laser velocimeter in accordance with the preferred embodiment of the present invention.

Referring now to FIG. 3, the rake pad 14 having a laser velocimeter means including an optical window 38 and being adapted to work in conjunction with a laser velocimeter 40. The present invention also contemplates a mounting means for attaching the laser velocimeter 40 to the rake pad 14. The laser velocimeter 40 directly measures flow velocities and therefore the rake pad 14 is configured to provide a means to directly measure flow velocities essentially in the metering plane 18 (as shown in FIG. 5) essentially at a position or a plurality of positions where static pressure measurements are taken using the static pressure probes 20 (in FIGS. 2 and 4) during calibration runs of the engine 8 and test facility 10 shown in FIG. 1. The calibration static pressure measurements and velocity measurements using laser velocimeter 40 are made near the wall of bellmouth 10, essentially in metering plane 18 (as illustrated in FIG. 5) and preferably outside of the boundary layer along the wall 22.

The rake pad 14 illustrated in FIGS. 2 and 3 has a laser velocimeter means including a removable optical window 38 and a pressure probe rake mounting means for disposing a traversing rake 16 and its pressure probes 20 through the port 13 of bellmouth 10 for taking total and static pressure measurements in the flow. The rake pad 14 also includes a probe cover plate 44a adapted to accept traversing probe rake 16 and for covering window aperture 46. A second laser cover plate 44b is effective for receiving and mounting the optical window 38 when the pad 14 is used in conjunction with laser velocimeter 40 during its operation. Rake pad 14 has a conventional elongated slot to permit total and static pressure probes to be inserted through the bellmouth wall and disposed in the bellmouth. Screws 50 are used to conveniently configure and reconfigure rake pad 14 for the various laser velocimeter and pressure probe calibration runs.

The calibration system of the present invention provides a previously unavailable method for calibrating a cross stream traversing static pressure measurement probe to NBS traceable standards. The calibrated pressure probe is then used to provide a "wall to wall" survey of metering plane velocity levels in the bellmouth. Using comparative analyses of predicted velocity levels, based on bellmouth static pressure measured and derived flow rate levels, provides a reference standard flow rate calibration.

Preferably, measured velocity levels obtained from the laser velocimeter (as illustrated in FIG. 5) and those derived from dynamic and static pressure measurements (illustrated in FIG. 4) made in accordance with the present invention, are compared to predicted velocity levels obtained from conventionally available stream tube curvature computer analyses, such as those described in NASA CR-2217 (National Aeronautics & Space Administration Contractor Report 2217, "Analytical Method For Predicting The Pressure Distribution About A Nacelle HT Transonic Speeds", by J. S. Keith, D. R. Ferguson, C. L. Merkle, P. H. Heck & D. J. Lahti. General Electric Company, Cincinnati, Ohio for Langley Research Center, 1973), which are also used to define boundary layer thickness levels and related measurement plane flow coefficient characteristics. Existing boundary layer measurement equipment and laser velocimeter measurements will be used to define the velocity profiles in the boundary layer region and/or in close proximity to the wall where probe and wall flow interference effects, which bias the pressure coefficient levels, typically exist.

The calibrated traversing rake probe system can also be used as a secondary standard pressure measurement device to calibrate an air metering bellmouth inlet by comparing measured results of the system and method of the present invention discussed above to results of conventionally predicated stream static pressure levels from, preferably computerized, analyses. One such analysis is described in NASA CR-2217 referenced above and may also be used to define boundary layer thickness levels and related measurement plane flow coefficient characteristics.

While the preferred embodiment of the present invention has been described fully in order to explain its principles, it is understood that various modifications or alterations may be made to the preferred embodiment without departing from the scope of the invention as set forth in the appended claims.

We claim:

1. An in situ flow calibration apparatus comprising:
   a traversing static pressure probe means effective for making static pressure measurements for use in determining local velocity distribution in a metering plane,
   a laser velocimeter effective for making direct velocity measurements, and
   a mounting means to mount said laser velocimeter to directly measure flow velocity in a region near a wall along a flow surface and to mount said traversing static probe means to measure static pressure,
   said mounting means being effective for making pressure and direct velocity measurements in essentially the same metering place and having a port in said wall adapted to accommodate a removable optical window and a removable mounting means for said traversing static probe.

2. A bellmouth inlet in situ flow calibration apparatus comprising:
   an annular bellmouth inlet test section having a metering plane,
   a traversing static pressure probe means effective for making static pressure measurements for use in determining local velocity distribution in said metering plane,
   a laser velocimeter effective for making direct velocity measurements, and
   a mounting means to mount said laser velocimeter to directly measure flow velocity in a region near a wall of the bellmouth inlet and to mount said traversing static probe means to measure static pressure,
   said mounting means being effective for making pressure and direct velocity measurements in essentially the same metering plane and having a port in said wall adapted to accommodate a removable optical window and a removable mounting means for said traversing static probe.

3. A bellmouth inlet in situ flow calibration apparatus as claimed in claim 2 wherein said traversing static probe means includes a plurality of static pressure probes and is effective for wall-to-wall static pressure survey measurements of said bellmouth with overlapping coverage of adjacent ones of said static pressure probes.

4. A bellmouth inlet in situ flow calibration apparatus as claimed in claim 3 wherein said mounting means includes a rake pad mounted in a port in a wall of a bellmouth wall inlet wherein said mounting means and said laser velocimeter means are effective to make laser velocimeter velocity measurements in a region within the bellmouth inlet near said wall.

5. A method for calibrating a static pressure based velocity flow test apparatus comprising:
   measuring a static pressure distribution in a metering plane with a traversing static pressure probe apparatus through a port in a wall containing the flow along a flow surface,
   deriving a first local velocity distribution in the metering plane from the measured static pressure distribution,
   directly measuring a second local velocity distribution in a portion of the metering plane through said port using a laser velocimeter, and
   comparing the first and second local velocity distributions to calibrate the traversing static pressure probe apparatus.

6. A method for calibrating a static pressure based velocity flow test apparatus as claimed in claim 5 wherein the metering plane is in a bellmouth inlet test section.

7. A method for calibrating a static pressure based velocity flow test apparatus as claimed in claim 6 wherein the bellmouth inlet test section has a plurality of circumferentially disposed ones of said port, and the steps of measuring a static pressure distribution in a metering plane with at traversing static pressure probe apparatus and directly measuring a second local velocity distribution are sequentially performed through each of the ports.

8. A method for calibrating a static pressure based velocity flow test apparatus as claimed in claim 7 further comprising using the calibrated traversing static pressure probe apparatus to calibrate the bellmouth inlet based on an analytically predicted velocity distribution.

9. A method for calibrating a static pressure based velocity flow test apparatus as claimed in claim 8 wherein said analytically predicted velocity distribution is a computerized stream tube curvature analysis.

* * * * *